US012753045B2

(12) United States Patent
Babu

(10) Patent No.: US 12,753,045 B2
(45) Date of Patent: Oct. 6, 2026

(54) SYSTEM AND A METHOD FOR CONTROLLING SWAY ANGLE OF AN ELEVATOR CABIN

(71) Applicants: Nithya Babu, Adyar (IN); Killakathu Ramanathan Babu, Adyar (IN)

(72) Inventor: Killakathu Ramanathan Babu, Chennai (IN)

(73) Assignee: Killakathu Babu, Chennai (IN)

( * ) Notice: Subject to any disclaimer, the term of this patent is extended or adjusted under 35 U.S.C. 154(b) by 0 days.

(21) Appl. No.: 18/292,004

(22) PCT Filed: Nov. 17, 2023

(86) PCT No.: PCT/IB2023/061637
§ 371 (c)(1),
(2) Date: Jan. 25, 2024

(87) PCT Pub. No.: WO2024/141818
PCT Pub. Date: Jul. 4, 2024

(65) Prior Publication Data
US 2025/0313431 A1 Oct. 9, 2025

(30) Foreign Application Priority Data
Dec. 30, 2022 (IN) ............................. 202241077169

(51) Int. Cl.
*B66B 1/34* (2006.01)
*B66B 5/02* (2006.01)
(Continued)

(52) U.S. Cl.
CPC .............. *B66B 5/02* (2013.01); *B66B 1/3492* (2013.01); *B66B 9/003* (2013.01); *B66B 11/043* (2013.01)

(58) Field of Classification Search
CPC ....... B66B 5/02; B66B 9/003; B66B 11/3492; B66B 11/043
(Continued)

(56) References Cited

U.S. PATENT DOCUMENTS

2015/0321882 A1* 11/2015 Pursiainen ............ B66B 5/0075 187/336
2018/0327228 A1* 11/2018 Rasanen ................... B66B 5/00
2025/0388433 A1* 12/2025 Hutchinson ............... B66B 9/02

FOREIGN PATENT DOCUMENTS

KR 20180053047 A 5/2018

OTHER PUBLICATIONS

ThyssenKrupp unveils the world's first sideways-moving elevator system, Ali Morris, Jul. 12, 2017 (https://www.dezeen.com/2017/07/12/thyssenkrupp-unveils-worlds-first-rope-less-sideways-moving-elevator-system-multi/ last viewed on Jan. 25, 2024).

* cited by examiner

*Primary Examiner* — Erick D Glass
(74) *Attorney, Agent, or Firm* — Jason C. Cameron

(57) ABSTRACT

A system 10 for controlling sway angle of an elevator cabin 20 is provided. The system includes a cart 30 mounted over tracks 40 via wheels 50. The cart is to move over the tracks upon driving the wheels by a first motor. The tracks includes horizontal segments 60 and vertical segments 70 joined together by curved segments 80. The system includes a platform 90 coupled to the cart through a pin joint. The platform includes an elevator cabin to accommodate passengers. The system includes a second motor coupled to the shaft 100 through a gear box 110. The second motor is to rotate the shaft bidirectionally to maintain the sway angle of the elevator cabin within a predefined limit. The system also
(Continued)

includes a control unit to provide control signals to the second motor to rotate the second motor based on positions of the cart on the tracks.

9 Claims, 7 Drawing Sheets

(51) Int. Cl.
*B66B 9/00* (2006.01)
*B66B 11/04* (2006.01)

(58) Field of Classification Search
USPC .......................................................... 187/247
See application file for complete search history.

SYSTEM AND A METHOD FOR CONTROLLING SWAY ANGLE OF AN ELEVATOR CABIN

CROSS-REFERENCE TO RELATED APPLICATION

This Application claims priority from a Complete Patent application filed in India having Patent Application No. 202241077169, filed on Dec. 30, 2022, and titled "A SYSTEM AND A METHOD FOR CONTROLLING SWAY ANGLE OF AN ELEVATOR CABIN" and a PCT Application No. PCT/IB2023/061637 filed on Nov. 17, 2023, and titled "A SYSTEM AND A METHOD FOR CONTROLLING SWAY ANGLE OF AN ELEVATOR CABIN."

FIELD OF INVENTION

Embodiments of the present disclosure relate to the field of lifting, and more particularly to a system and a method for controlling sway angle of an elevator cabin.

BACKGROUND

An elevator is a machine that transports people and freight between different levels of a building, a structure and a maritime vessel. The elevator is classified based on an actuating mechanism, as a cable-assisted elevator, a hydraulic cylinder-assisted elevator and the like. Generally, an elevator car is attached to a control unit through cables in the cable-assisted elevator. A hydraulic piston may be used to move the elevator car in the hydraulic cylinder-assisted elevator.

Even though the elevator that is currently being used can travel in a horizontal direction as well as in a vertical direction, the elevator car may be subjected to swaying when the elevator is in motion. The swaying of the elevator car may be caused by varying acceleration, motion of the elevator along a curved path, starting operation of the elevator, stopping operation of the elevator and the like. The swaying of the elevator car may cause accidents to occupants of the elevator car by inducing slippage. The elevator that is currently being used fails to ensure the stability of the elevator car by limiting the extent of the swaying experienced by the elevator car.

Hence, there is a need for an improved system and a method for controlling sway angle of an elevator cabin to address the aforementioned issue(s).

BRIEF DESCRIPTION

In accordance with an embodiment of the present disclosure, a system for controlling sway angle of an elevator cabin is provided. The system includes a cart mounted over a plurality of tracks via a plurality of wheels. The cart is adapted to move over the plurality of tracks upon driving the plurality of wheels by a first motor. The plurality of tracks includes one or more horizontal segments and one or more vertical segments joined together by one or more corresponding curved segments. The system also includes a platform mechanically coupled to the cart through a shaft forming a pin joint adapted to enable rotation of the platform corresponding to a rotation of the shaft. The platform includes an elevator cabin adapted to accommodate one or more passengers when the cart is moving over the plurality of tracks. The system further includes a second motor coupled to the shaft through a gear box. The second motor is adapted to rotate the shaft bidirectionally to maintain the sway angle of the elevator cabin within a predefined limit. The system also includes a control unit electrically coupled to the second motor. The control unit is adapted to provide one or more control signals to the second motor to rotate the second motor based on one or more corresponding positions of the cart on the plurality of tracks, thereby controlling the sway angle of the elevator cabin.

In accordance with another embodiment of the present disclosure, a method for controlling sway angle of an elevator cabin is provided. The method includes moving, by a plurality of wheels, a cart over a plurality of tracks upon driving the plurality of wheels by a first motor. The plurality of tracks includes one or more horizontal segments and one or more vertical segments joined together by one or more corresponding curved segments. The method also includes providing, by a control unit, one or more control signals to a second motor to rotate the second motor based on one or more corresponding positions of the cart on the plurality of tracks. The method further includes rotating, by a shaft, a platform including an elevator cabin bidirectionally to maintain the sway angle of the elevator cabin within a predefined limit corresponding to the rotation of the second motor. The platform is mechanically coupled to the cart through the shaft forming a pin joint adapted to enable rotation of the platform corresponding to a rotation of the shaft. The elevator cabin is adapted to accommodate one or more passengers when the cart is moving over the plurality of tracks.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
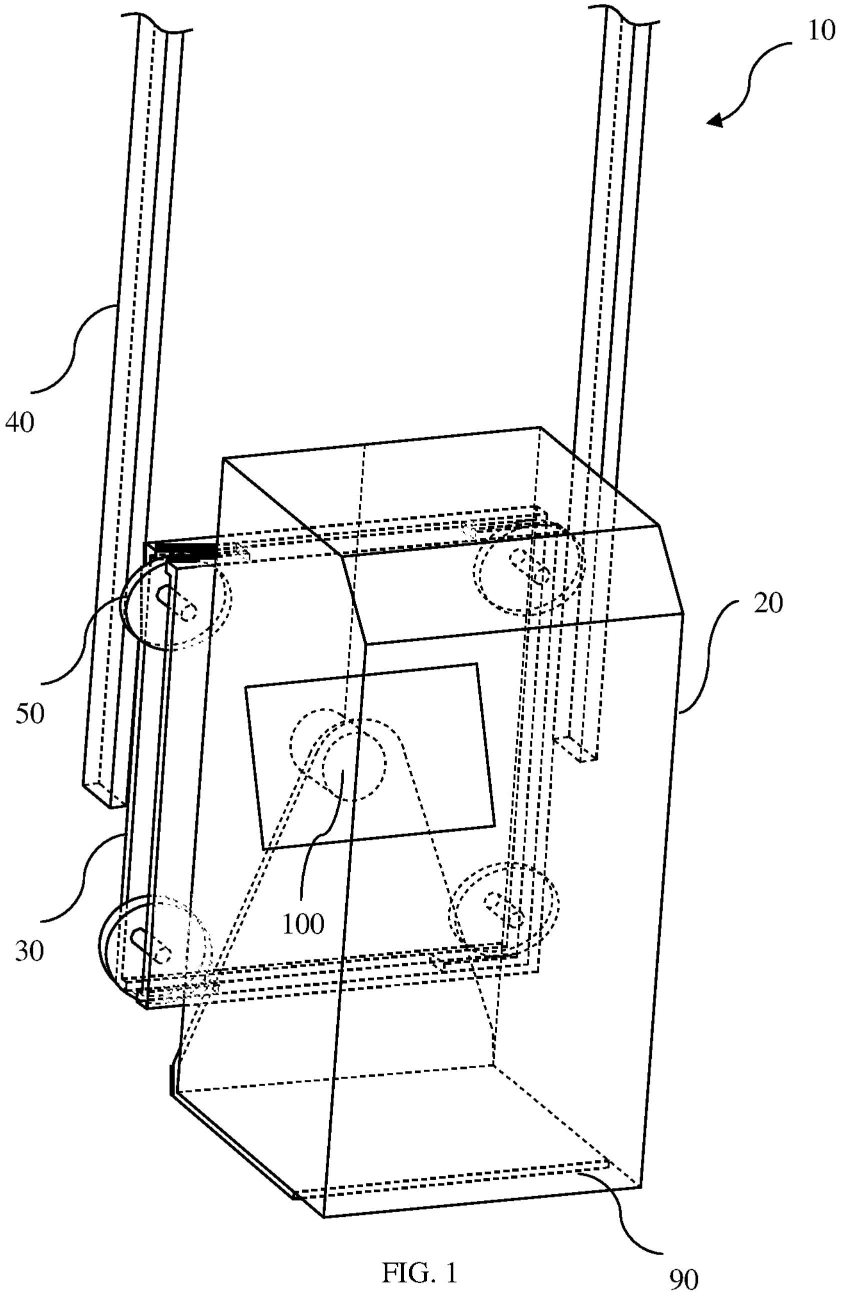
FIG. 1 is a schematic representation of a system for controlling sway angle of an elevator cabin in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In the discussion that follows, references will be made to "first motor", and "second motor" with reference to an entity (motor) that is used to drive the plurality of wheels and the shaft respectively. Also, references will be made to "first position", "second position" and "third position" with reference to relative positions of the platform with respect to the cart when the sway angle is zero, positive and negative respectively.

Embodiments of the present disclosure relate to a system and a method for controlling sway angle of an elevator cabin. The system includes a cart mounted over a plurality of tracks via a plurality of wheels. The cart is adapted to move over the plurality of tracks upon driving the plurality of wheels by a first motor. The plurality of tracks includes one or more horizontal segments and one or more vertical segments joined together by one or more corresponding curved segments. The system also includes a platform mechanically coupled to the cart through a shaft forming a pin joint adapted to enable rotation of the platform corresponding to a rotation of the shaft. The platform includes an elevator cabin adapted to accommodate one or more passengers when the cart is moving over the plurality of tracks. The system further includes a second motor coupled to the shaft through a gear box. The second motor is adapted to rotate the shaft bidirectionally to maintain the sway angle of the elevator cabin within a predefined limit. The system also includes a control unit electrically coupled to the second motor. The control unit is adapted to provide one or more control signals to the second motor to rotate the second motor based on one or more corresponding positions of the cart on the plurality of tracks, thereby controlling the sway angle of the elevator cabin.

FIG. 1 is a schematic representation of a system 10 for controlling sway angle of an elevator cabin 20 in accordance with an embodiment of the present disclosure. The system 10 includes a cart 30 mounted over a plurality of tracks 40 via a plurality of wheels 50. The cart 30 is adapted to move over the plurality of tracks 40 upon driving the plurality of wheels 50 by a first motor (not shown in FIG. 1). In one embodiment, the first motor may include at least one of an induction motor, a brushless direct current motor, and a switched reluctance motor. In one embodiment, the cart 30 may be adapted to move over the plurality of tracks 40 in at least one of a horizontal direction and a vertical direction.

Further, the system 10 also includes a platform 90 mechanically coupled to the cart 30 through a shaft 100 forming a pin joint adapted to enable rotation of the platform 90 corresponding to a rotation of the shaft 100. The platform 90 includes the elevator cabin 20 adapted to accommodate one or more passengers when the cart 30 is moving over the plurality of tracks 40. In one embodiment, the shaft 100 may include a positional encoder (not shown in FIG. 1) adapted to sense the sway angle of the elevator cabin 20. As used herein, the sway angle may be defined as angle between a vertical axis of the cart 30 and a vertical axis of the elevator cabin 20. In one embodiment, the positional encoder may include, but not limited to, a mechanical encoder, an optical encoder, a magnetic encoder, an electromagnetic encoder and the like.

Figure 3:
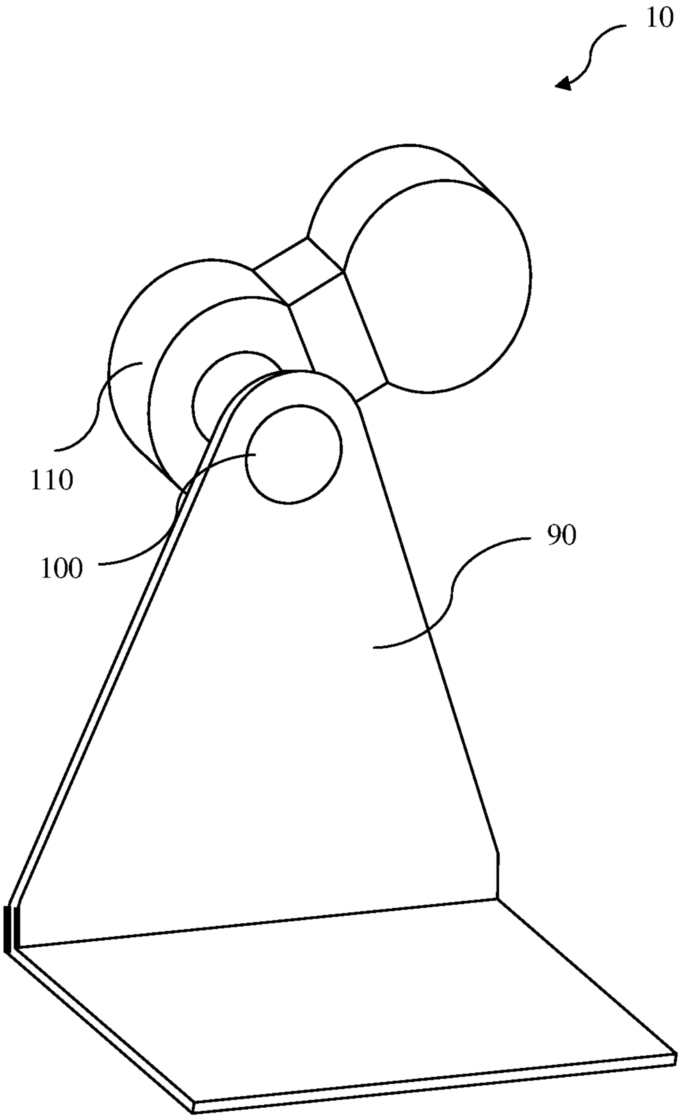
FIG. 3 is a schematic representation of another embodiment of a system of FIG. 1, depicting operational arrangement of a platform, a shaft and a gearbox in accordance with an embodiment of the present disclosure.

Moreover, the system 10 further includes a second motor (not shown in FIG. 1) coupled to the shaft 100 through a gear box (FIG. 3, 110). In one embodiment, the second motor may include at least one of an induction motor, a brushless direct current motor, and a switched reluctance motor. The second motor is adapted to rotate the shaft 100 bidirectionally to maintain the sway angle of the elevator cabin 20 within a predefined limit. The system 10 also includes a control unit (not shown in FIG. 1) electrically coupled to the second motor. The control unit is adapted to provide one or more control signals to the second motor to rotate the second motor based on one or more corresponding positions of the cart 30 on the plurality of tracks 40, thereby controlling the sway angle of the elevator cabin 20.

Additionally, in some embodiments, the plurality of tracks 40 may include one or more reed sensors (not shown in FIG. 1) adapted to sense one or more corresponding positions of the cart 30 over the plurality of tracks 40. In one embodiment, the control unit may use a look up table to obtain a value of the sway angle required for the corresponding one or more positions of the cart 30 over the plurality of tracks 40. In such an embodiment, the control unit may provide the one or more control signals to the second motor corresponding to the value of the sway angle obtained from the look up table. In a specific embodiment, the control unit may use the look up table to obtain a reference speed of the cart 30 corresponding to the one or more positions of the cart 30 over the plurality of tracks 40.

Furthermore, in such an embodiment, the control unit may generate one or more switching signals to the first motor based on the reference speed of the cart 30 obtained from the look up table to rotate the first motor. In one embodiment, the control unit may be adapted to provide the one or more control signals based on an error signal generated by a comparator. In such an embodiment, the error signal may include a difference between the sway angle of the elevator cabin 20 sensed by the positional encoder and a prestored sway angle. In a specific embodiment, the control unit may include at least one of a fuzzy logic controller (not shown in FIG. 1) and a proportional integral derivative controller (not shown in FIG. 1). Detailed view of the plurality of tracks 40 is shown in FIG. 2.

Figure 2:
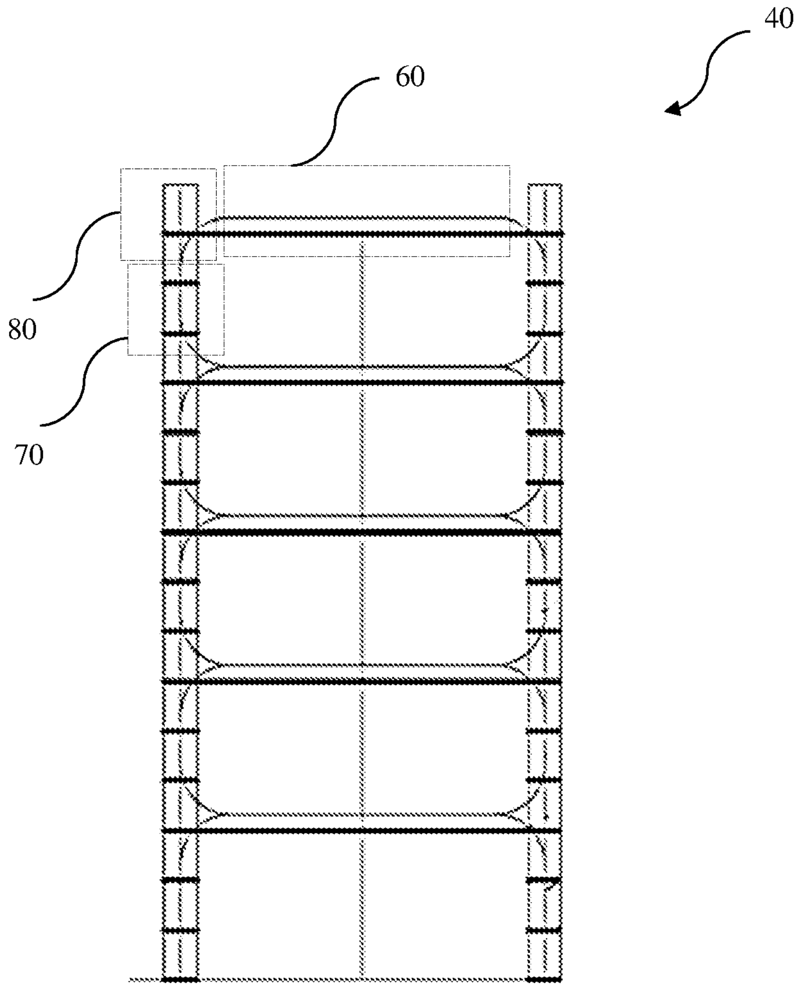
FIG. 2 is a schematic representation of one embodiment of a system of FIG. 1, depicting detailed diagram of a plurality of tracks in accordance with an embodiment of the present disclosure.

FIG. 2 is a schematic representation of one embodiment of a system 10 of FIG. 1, depicting detailed view of the plurality of tracks 40 in accordance with an embodiment of the present disclosure. The plurality of tracks 40 includes one or more horizontal segments 60 and one or more vertical segments 70 joined together by one or more corresponding curved segments 80. Operational arrangement of the platform 90, the shaft 100 and the gearbox 110 is shown in FIG. 3.

FIG. 3 is a schematic representation of another embodiment of a system 10 of FIG. 1, depicting operational arrangement of the platform 90, the shaft 100 and the gearbox in accordance with an embodiment of the present disclosure. Coupling of the platform 90 with the cart 30 through a plurality of gears 120 is shown in FIG. 4.

Figure 4:
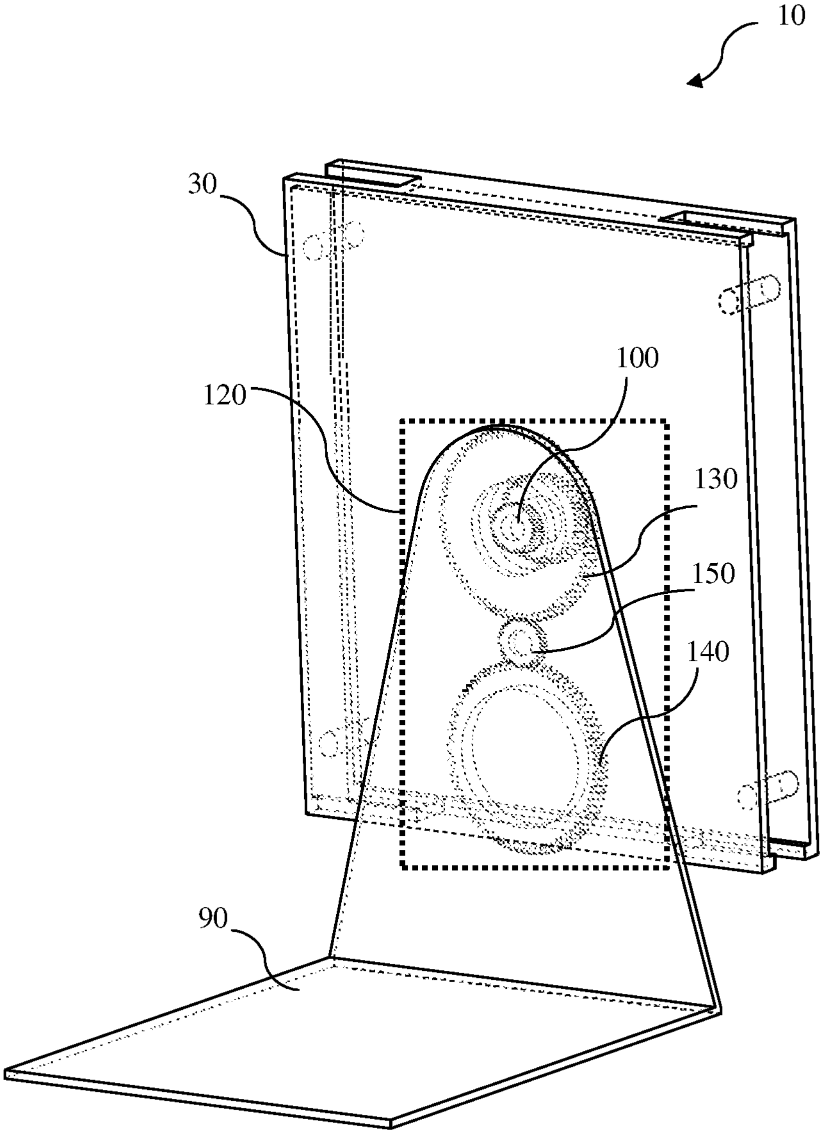
FIG. 4 is a schematic representation of yet another embodiment of a system of FIG. 1, depicting coupling of an elevator cabin with a cart through a plurality of gears in accordance with an embodiment of the present disclosure.

FIG. 4 is a schematic representation of yet another embodiment of a system 10 of FIG. 1, depicting coupling of the platform 90 with the cart 30 through a plurality of gears 120 in accordance with an embodiment of the present disclosure. In some embodiments, the platform 90 may be mechanically coupled with the cart 30 through a plurality of gears 120 adapted to distribute weight of the platform 90 to the cart 30. In such an embodiment, the plurality of gears 120 may include a first gear 130, a second gear 140, and a third gear 150. In one embodiment, the first gear 130 may be encircling the shaft 100 and coupled to the cart 30. In such an embodiment, the second gear 140 may be coupled to the platform 90 and the third gear 150 may be interfacing the first gear 130 and the second gear 140 during the rotation of the shaft 100. Relative positions of the elevator cabin 20 with respect to the cart 30 at different values of the sway angles are shown in FIG. 5.

Figure 5:
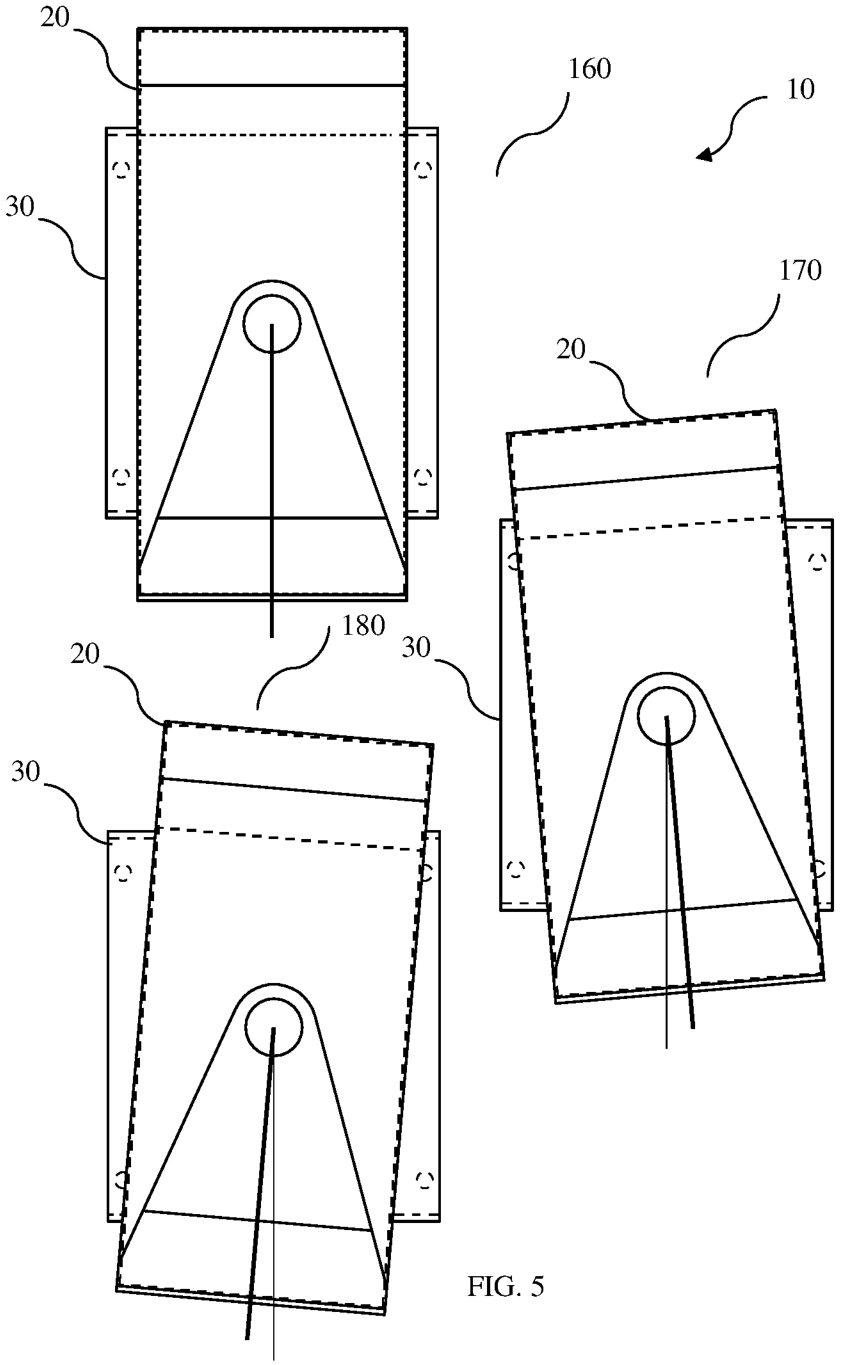
FIG. 5 is a schematic representation of yet another embodiment of a system of FIG. 1, depicting relative positions of the elevator cabin with respect to the cart at different values of the sway angles in accordance with an embodiment of the present disclosure.

FIG. 5 is a schematic representation of yet another embodiment of a system 10 of FIG. 1, depicting relative positions of the elevator cabin 20 with respect to the cart 30 at different values of the sway angles in accordance with an embodiment of the present disclosure. A first position 160 of the elevator cabin 20, a second position 170 of the elevator cabin 20, a third position 180 of the elevator cabin 20 when the sway angle is zero, when the sway angle is negative and when the sway angle is positive respectively is shown in the FIG. 5. The relative positions of the elevator cabin 20 with respect to the plurality of tracks 40 during an operation of the elevator is shown in FIG. 6.

Figure 6:
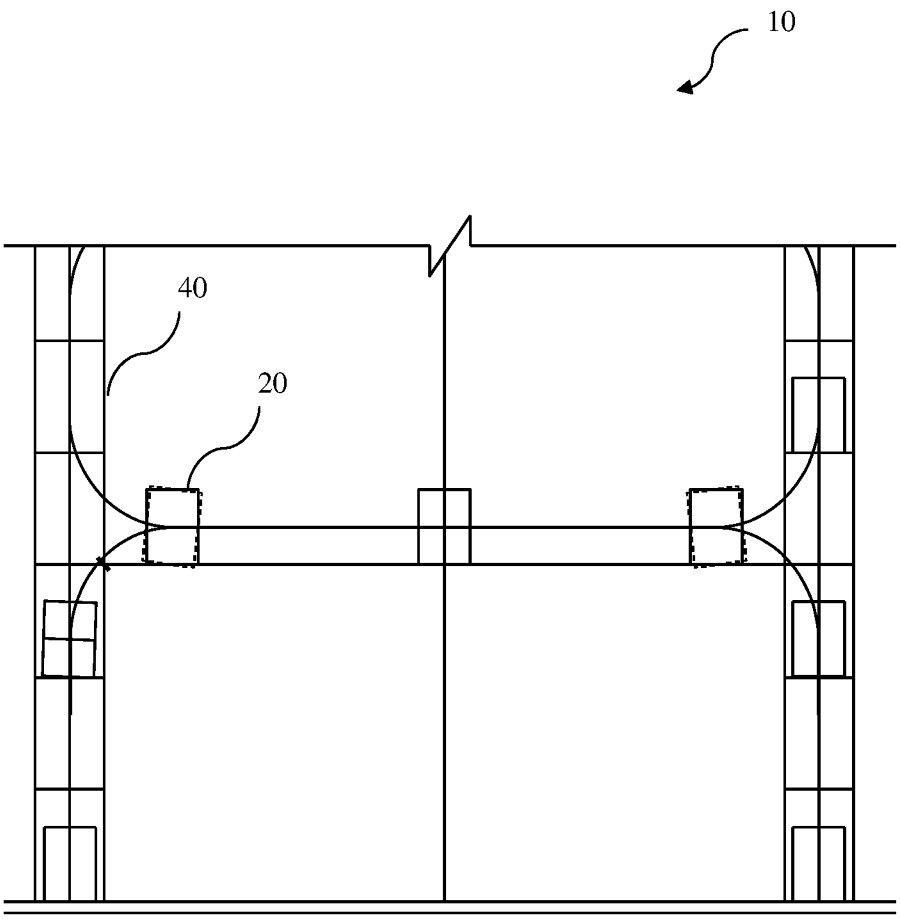
FIG. 6 is a schematic representation of yet another embodiment of a system of FIG. 1, depicting the relative positions of the elevator cabin with respect to the plurality of tracks during an operation of the elevator in accordance with an embodiment of the present disclosure.

FIG. 6 is a schematic representation of yet another embodiment of a system 10 of FIG. 1, depicting the relative positions of the elevator cabin 20 with respect to the plurality of tracks 40 during an operation of the elevator in accordance with an embodiment of the present disclosure. Detailed explanation of the elevator cabin 20 and the plurality of tracks 40 are provided along with the FIG. 1 description.

Figure 7:
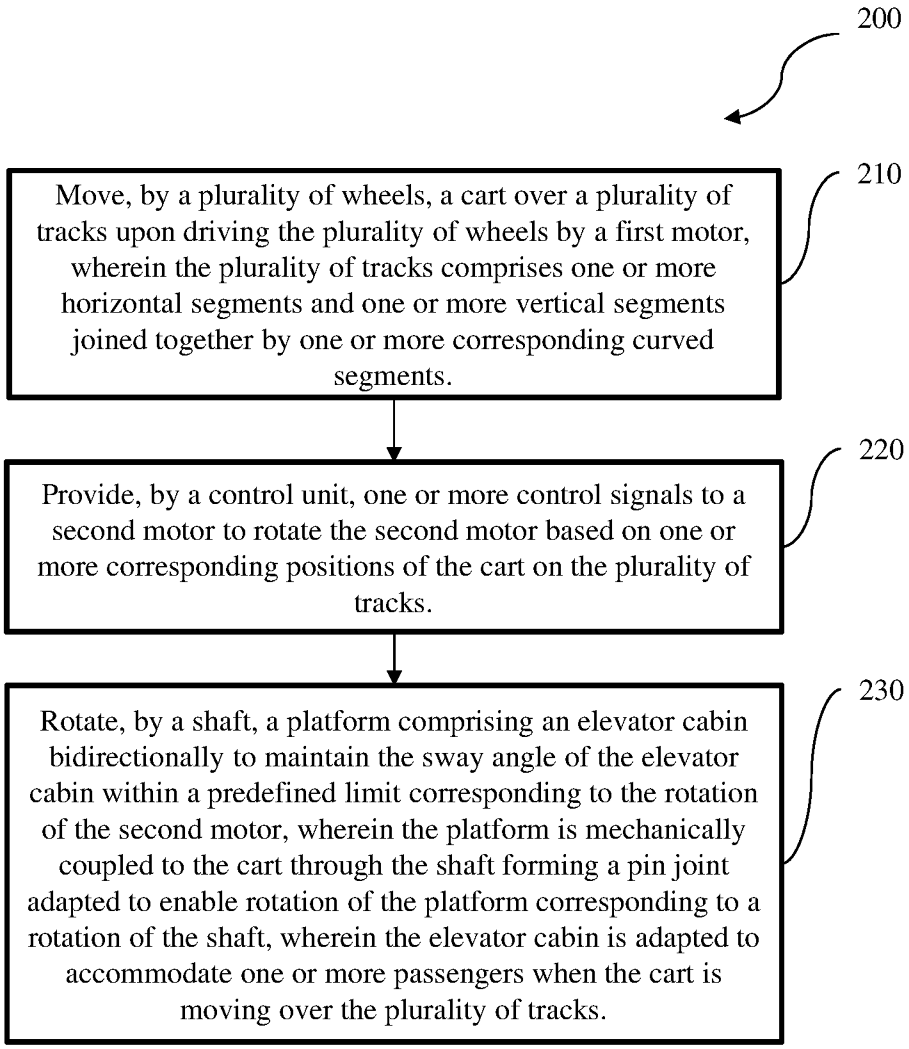
FIG. 7 is a flow chart representing the steps involved in a method for controlling sway angle of the elevator cabin in accordance with an embodiment of the present disclosure.

FIG. 7 is a flow chart representing the steps involved in a method 200 for controlling sway angle of an elevator cabin in accordance with an embodiment of the present disclosure. The method 200 includes moving a cart over a plurality of tracks upon driving the plurality of wheels by a first motor in step 210. In one embodiment, moving a cart over a plurality of tracks upon driving the plurality of wheels by a first motor includes moving a cart over a plurality of tracks upon driving the plurality of wheels by a first motor by a plurality of wheels. The plurality of tracks comprises one or more horizontal segments and one or more vertical segments joined together by one or more corresponding curved segments. In one embodiment, the first motor may include at least one of an induction motor, a brushless direct current motor, and a switched reluctance motor. In one embodiment, the cart may be adapted to move over the plurality of tracks in at least one of a horizontal direction and a vertical direction.

The method 200 also includes providing one or more control signals to a second motor to rotate the second motor based on one or more corresponding positions of the cart on the plurality of tracks in step 220. In one embodiment, providing one or more control signals to a second motor to rotate the second motor based on one or more corresponding positions of the cart on the plurality of tracks includes providing one or more control signals to a second motor to rotate the second motor based on one or more corresponding positions of the cart on the plurality of tracks by a control unit. In some embodiments, the plurality of tracks may include one or more reed sensors adapted to sense one or more corresponding positions of the cart over the plurality of tracks.

Further, in one embodiment, the control unit may use a look up table to obtain a value of the sway angle required for the corresponding one or more positions of the cart. In such an embodiment, the control unit may provide the one or more control signals corresponding to the value of the sway angle obtained from the look up table. In a specific embodiment, the control unit may use the look up table to obtain a reference speed of the cart corresponding to the one or more positions of the cart. In such an embodiment, the control unit may generate one or more switching signals to the first motor based on the reference speed of the cart obtained from the look up table to rotate the first motor. In one embodiment, the second motor may include at least one of an induction motor, a brushless direct current motor, and a switched reluctance motor.

In one embodiment, the control unit may be adapted to provide the one or more control signals based on an error signal generated by a comparator. In such an embodiment, the error signal may include a difference between the sway angle of the elevator cabin sensed by the positional encoder and a prestored sway angle. In a specific embodiment, the control unit may include at least one of a fuzzy logic controller and a proportional integral derivative controller.

The method 200 further includes rotating a platform comprising an elevator cabin bidirectionally to maintain the sway angle of the elevator cabin within a predefined limit corresponding to the rotation of the second motor in step 230. In one embodiment, rotating a platform comprising an elevator cabin bidirectionally to maintain the sway angle of the elevator cabin within a predefined limit corresponding to the rotation of the second motor includes rotating a platform comprising an elevator cabin bidirectionally to maintain the sway angle of the elevator cabin within a predefined limit corresponding to the rotation of the second motor by a shaft. The platform is mechanically coupled to the cart through the shaft forming a pin joint adapted to enable rotation of the platform corresponding to a rotation of the shaft.

Further, the elevator cabin is adapted to accommodate one or more passengers when the cart is moving over the plurality of tracks. In one embodiment, the shaft may include a positional encoder adapted to sense the sway angle of the elevator cabin. As used herein, the sway angle may be defined as angle between a vertical axis of the cart and a vertical axis of the elevator cabin. In one embodiment, the positional encoder may include, but not limited to, a mechanical encoder, an optical encoder, a magnetic encoder, an electromagnetic encoder and the like. In some embodiments, the platform may be mechanically coupled with the cart through a plurality of gears adapted to distribute weight of the platform to the cart. In such an embodiment, the plurality of gears may include a first gear, a second gear, and a third gear. In one embodiment, the first gear may be encircling the shaft. In such an embodiment, the second gear may be coupled to the platform and the third gear may be interfacing the first gear and the second during the rotation of the shaft.

Various embodiments of the system and a method for controlling sway angle of an elevator cabin described above enable various advantages. Provision of the control unit is capable of generating the one or more control signals to rotate the second motor and the shaft for controlling the sway angle of the elevator cabin. Provision of the one or more reed switches are capable of relaying the one or more positions of the cart to the control unit, thereby enabling the control unit to accurately control the sway angle of the elevator cabin based on the one or more positions of the cart. A combination of the positional encoder, and at least one of the fuzzy logic controller and the proportional integral derivative controller present in the control unit enables closed loop control of the sway angle of the elevator cabin by the control unit.

Further, provision of the plurality of gears between the platform and the cart provides a way for distributing the weight of the platform to the cart to reduce stress being developed on the shaft thereby improving safety of the system. Provision of the plurality of tracks enables seamless movement of the elevator cabin in the horizontal direction and the vertical direction, thereby providing better accessibility to the various location of the building. The system is stable and is capable of providing a smoother transportation to the occupants of the elevator cabin without any oscillations of the elevator cabin. The control unit is also capable of controlling the speed of the cart by providing the one or more control signals to the first motor, thereby ensuring superior controllability of the system.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system (10) for controlling sway angle of an elevator cabin (20) comprising:

a cart (30) mounted over a plurality of tracks (40) via a plurality of wheels (50), wherein the cart (30) is adapted to move over the plurality of tracks (40) upon driving the plurality of wheels (50) by a first motor, wherein the plurality of tracks (40) comprises one or more horizontal segments (60) and one or more vertical segments (70) joined together by one or more corresponding curved segments (80);

a platform (90) mechanically coupled to the cart (30) through a shaft (100) forming a pin joint adapted to enable rotation of the platform (90) corresponding to a rotation of the shaft (100), wherein the platform (90) comprises the elevator cabin (20) adapted to accommodate one or more passengers when the cart (30) is moving over the plurality of tracks (40);

a second motor coupled to the shaft (100) through a gear box (110), wherein the second motor is adapted to rotate the shaft (100) bidirectionally to maintain the sway angle of the elevator cabin (20) within a predefined limit; and a control unit electrically coupled to the second motor, wherein the control unit is adapted to provide one or more control signals to the second motor to rotate the second motor based on one or more corresponding positions of the cart (30) on the plurality of tracks (40), thereby controlling the sway angle of the elevator cabin (20).

2. The system (10) as claimed in claim 1, wherein the cart (30) is adapted to move over the plurality of tracks (40) in at least one of a horizontal direction and a vertical direction.

3. The system (10) as claimed in claim 1, wherein the plurality of tracks (40) comprises one or more reed sensors adapted to sense one or more corresponding positions of the cart (30) over the plurality of tracks (40).

4. The system (10) as claimed in claim 1, wherein the first motor comprises at least one of an induction motor, a brushless direct current motor, and a switched reluctance motor.

5. The system (10) as claimed in claim 1, wherein the shaft (100) comprises a positional encoder adapted to sense the sway angle of the elevator cabin (20).

6. The system (10) as claimed in claim 1, wherein the platform (90) is mechanically coupled with the cart (30) through a plurality of gears (120) adapted to distribute weight of the platform (90) to the cart (30).

7. The system (10) as claimed in claim 1, wherein the control unit is adapted to provide the one or more control signals based on an error signal generated by a comparator, wherein error signal comprises a difference between the sway angle of the elevator cabin (20) sensed by a positional encoder and a prestored sway angle.

8. The system (10) as claimed in claim 7, wherein the control unit comprises at least one of a fuzzy logic controller and a proportional integral derivative controller.

9. A method (200) for controlling sway angle of an elevator cabin comprising:

moving, by a plurality of wheels, a cart over a plurality of tracks upon driving the plurality of wheels by a first motor, wherein the plurality of tracks comprises one or more horizontal segments and one or more vertical segments joined together by one or more corresponding curved segments; (210)

providing, by a control unit, one or more control signals to a second motor to rotate the second motor based on one or more corresponding positions of the cart on the plurality of tracks; (220) and rotating, by a shaft, a platform comprising an elevator cabin bidirectionally to maintain the sway angle of the elevator cabin within a predefined limit corresponding to the rotation of the second motor, wherein the platform is mechanically coupled to the cart through the shaft forming a pin joint adapted to enable rotation of the platform corresponding to a rotation of the shaft, wherein the elevator cabin is adapted to accommodate one or more passengers when the cart is moving over the plurality of tracks (230).

* * * * *